United States Patent [19]

Brewer

[11] Patent Number: 4,520,909

[45] Date of Patent: Jun. 4, 1985

[54] CLUTCH ACTUATOR

[76] Inventor: Carl T. Brewer, 334 Lyonnais, Creve Coeur, Mo. 63141

[21] Appl. No.: 331,321

[22] Filed: Dec. 16, 1981

[51] Int. Cl.³ .............................................. B60K 41/02
[52] U.S. Cl. .............................. 192/0.02 R; 192/0.034; 192/0.07; 192/0.096; 192/150
[58] Field of Search ............... 192/0.032, 0.033, 0.034, 192/0.07, 0.075, 0.076, 0.096, 2, 56 R, 150, 101, 0.02 R; 361/239, 241; 198/256; 310/68 C, 76, 78, 94

[56] References Cited

U.S. PATENT DOCUMENTS

| | | | |
|---|---|---|---|
| 1,040,863 | 10/1912 | Blaxter | 192/150 |
| 1,469,802 | 10/1923 | Mellenthin | 192/150 |
| 1,596,051 | 8/1926 | Kramer | 192/150 |
| 1,742,434 | 1/1930 | Costello | 192/150 |
| 2,062,135 | 11/1936 | Lilja | 192/150 |
| 2,153,195 | 4/1939 | Lilja | 192/150 |
| 2,346,047 | 4/1944 | Otto | 192/150 |
| 2,850,654 | 9/1958 | Jaeschke | 310/94 |
| 2,978,965 | 4/1961 | Armitage et al. | 192/150 |
| 3,005,540 | 10/1961 | Hinderaker | 198/856 |
| 3,248,985 | 5/1966 | Hitchcock et al. | 192/150 |
| 4,223,829 | 9/1980 | Bange | 192/0.032 |
| 4,265,320 | 5/1981 | Tanaka et al. | 192/0.034 |
| 4,321,991 | 3/1982 | Teijido et al. | 192/0.034 |

Primary Examiner—George H. Krizmanich
Attorney, Agent, or Firm—Cohn, Powell & Hind

[57] ABSTRACT

A clutch actuator for use in a motor driven conveyor system includes an electrical motor and a conveyor driven by the motor with a clutch interconnecting the motor and conveyor in drive relation. The clutch actuator is responsive to motor current for actuating the clutch for selectively disconnecting the motor and the conveyor. A clutch actuator actuates the clutch, for disconnecting the motor from the conveyor, when the sense current is greater than a selectively adjusted predetermined value. The clutch actuator is selectively manually actuated for actuating the clutch for disconnecting the motor from the conveyor and selectively manually actuated for actuating the clutch for connecting the motor to the conveyor.

10 Claims, 2 Drawing Figures

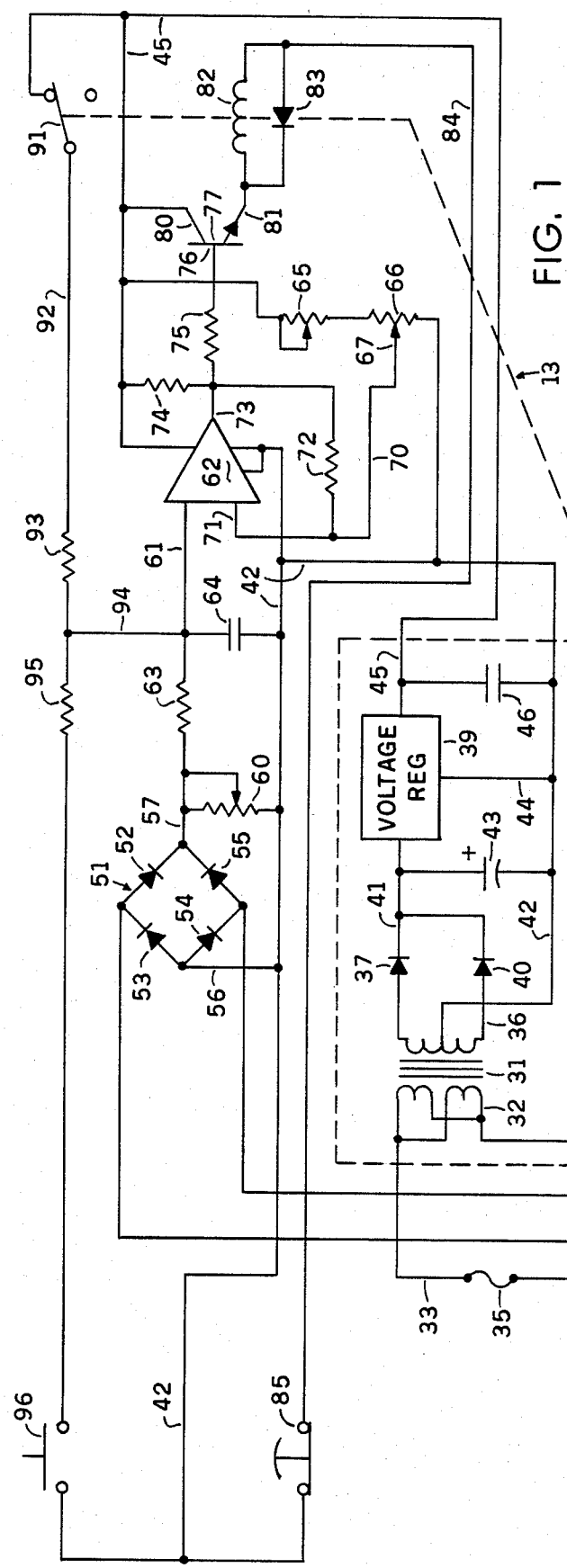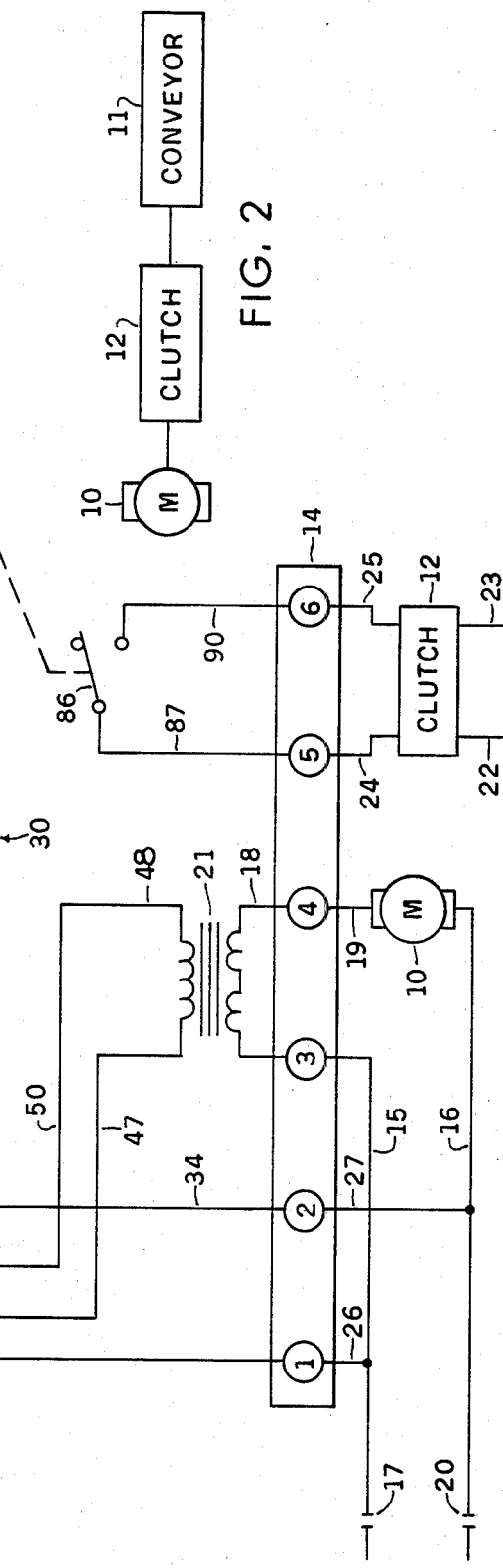
FIG. 1
FIG. 2

CLUTCH ACTUATOR

BACKGROUND OF THE INVENTION

This invention relates to a clutch actuator in general, and particularly to a device for actuating a clutch for disconnecting a drive motor from a load when the motor current exceeds a predetermined value.

Motor driven loads such as conveyors, utilized in bottling and canning operations, are susceptible to jamming. On the occurence of a conveyor jam, damage can result to the drive linkage and the drive motor. Various means of preventing damage to the drive system in conveyor applications have been deviced. For instance, shear pins can be utilized which will break under jam conditions, thereby disconnecting the motor from the load. In U.S. Pat. No. 2,273,451, the use of a friction clutch for disengaging a motor from a conveyor under jam conditions is disclosed. The use of shear pins or friction clutches do not permit the precise setting of a point at which the motor and load will be disconnected. Moreover, these types of devices do not allow for routine disconnection of the motor from the load during normal operation of the conveyor such as during motor start-up or when it is desired to momentarily halt the conveyor.

SUMMARY OF THE INVENTION

This clutch actuator provides for a precise setting of overload condition at which point the motor can be completely disconnected from the load. Furthermore, the clutch actuator includes manually actuated means for selectively actuating the clutch for connecting or disconnecting the motor from the conveyor.

The improved motor driven conveyor system includes an electrical motor and a conveyor driven by the motor. A clutch interconnects the motor and the conveyor in drive relation. The clutch-actuating means is responsive to motor current for actuating the clutch and selectively disconnecting the motor and the conveyor.

In one aspect of the invention, the clutch is electrically actuated. In another aspect of the invention, the clutch-actuating means senses motor current for actuating the clutch. The clutch-actuating means actuates the clutch for disconnecting the motor from the conveyor when the sensed current is greater than a predetermined value. The clutch-actuating means is selectively adjustable for setting the predetermined value.

The clutch-actuating means includes manually actuated means for selectively actuating the clutch for disconnecting the motor from the conveyor. The clutch-actuating means further includes manually actuating means for selectively actuating the clutch for connecting the motor to the conveyor.

BRIEF DESCRIPTION OF THE DRAWINGS

FIG. 1 is an electrical schematic view of the improved motor driven conveyor system, and FIG. 2 is a mechanical schematic view of the improved motor driven conveyor system.

DESCRIPTION OF THE PREFERRED EMBODIMENT

Referring now by characters of reference to the drawing, and first to FIG. 2, it will be understood that a motor 10 is connected to a load comprising a conveyor 11 in drive relation through a clutch 12. The clutch 12 is an electrically actuated clutch of a conventional type.

Referring now to FIG. 1, it will be seen that the motor 10 and clutch 12 are electrically connected to a clutch actuator, generally indicated by 13, at the terminal strip 14. Power is supplied to the motor 10 by the power lines 15 and 16. Located on the power lines 15 and 16 are motor starter contacts 17 and 20 which are actuated by a conventional motor starter (not shown). One of the lines 15 and 16, which in the embodiment shown is line 16, is wired directly to the motor. The other of the lines 15 and 16, which in this embodiment is line 15, is connected to the motor through the primary transformer winding 18 of a current-sensing transformer 21. The current-sensing transformer 21 is connected to the terminals 3 and 4 of the terminal strip 14, with the line 15 being connected to the terminal 3, and the motor 10 being connected to terminal 4 of the terminal strip 14 by line 19.

Power is supplied to the clutch 12 from a conventional source as by the lines 22 and 23. Clutch switch lines 24 and 25 are connected to the terminals 5 and 6 of the terminal strip 14. It will be understood that the switch lines 24 and 25 are used for controlling the clutch 12. The lines 24 and 25 are selectively electrically connected for actuating the clutch 12 for connecting the motor 10 to the conveyor 11. The lines 24 and 25 are selectively electrically disconnected for actuating the clutch 12 for disconnecting the motor 10 from the conveyor 11.

A first power line 26 connects the motor power line 15 to the terminal strip 14 terminal 1, while a power line 27 connects the motor power line 16 to the terminal 2 of the terminnal strip 14 for powering the clutch actuator 13. It will be understood that the power lines 26 and 27 could be connected to any suitable source of power, however the motor power lines 15 and 16 provide a convenient point for powering the clutch actuator 13.

The clutch actuator 13 contains a power supply indicated generally by 30. The power supply 30 includes a transformer 31 having a primary winding 32 which is connected by lines 33 and 34 to the terminals 1 and 2 of the terminal strip 14 for providing power to the transformer 31. The line 33 includes a fuse 35 for protecting the clutch actuator 13 from any internal over-current condition.

The transformer 31 includes a center tap secondary 36 with diodes 37 and 40 connected to the transformer secondary 36 to provide a conventional full wave rectifier circuit having a positive output at line 41 and a negative line 42 connected to the center tap of the transformer secondary 36. Interconnecting the positive and negative lines 41 and 42 is a filter capacitor 43. A conventional electronic voltage regulator 39 has its input connected to the line 41, its common or ground side connected by line 44 to the negative line 42, and its positive ouput connected to positive line 45 which supplies the regulated operating voltage for the clutch actuator 13. An output filter capacitor 46 interconnects the positive output line 45 and the negative or common line 42.

The current-sensing transformer 21 includes a secondary 48 which is connected by the lines 47 and 50 to a full wave rectifier bridge 51 composed of diodes 52, 53, 54 and 55 connected in a conventional manner. The negative output side of the full wave rectifier bridge 51 is connected by the line 56 to the negative or common line 42, and the positive output of the bridge 51 is connected to a line 57. A potentiometer 60 connects the line 57 to the negative power lines 42 for selective adjustment of the resistance between the lines 57 and 42.

The line 57 is connected to an input 61 of an op-amp 62 by resistor 63. A capacitor 64 is connected between the input 61 of the op-amp 62 and the negative line 42. The op-amp 62 is connected to the positive line 45 and the negative line 42 in a conventional operative manner.

Serially connected between the positive line 45 and the negative line 42 is a potentiometer 65, which is connected in a manner to provide variable resistance, and a potentiometer 66 which is hooked up in a voltage divider fashion. The rotor connection 67 of the potentiometer 66 is connected by a line 70 to a second input 71 of the op-amp 62.

A resistor 72 is connected between an output 73 of the op-amp 62 and the line 70 connected to the input 71 of the op-amp 62. A resistor 74 is connected between the positive supply line 45 and the output 73 of the op-amp 62.

A resistor 75 interconnects the output 73 and a base 76 of a switching transistor 77. The collector 80 of the switching transistor 77 is connected to the positive supply line 45, while the emitter 81 is connected to a relay coil 82. Connected across the relay coil 82 is a diode 83. The relay coil 82, in turn, is connected by line 84 to a normally closed stop switch 85, which has its other side connected to the negative line 42.

The relay coil 82 operates a first relay switch 86 for selectively interconnecting the terminals 5 and 6 of the terminal strip 14. The relay switch 86 is connected by a line 87 to the terminal 5 of the terminal strip 14, and through a normally open connection, by a line 90, to the terminal 6 of the terminal strip 14.

A second relay switch 90 operates as a normally closed switch with one side being connected to the positive line 45 and the other side being connected to a line 92. The line 92 is in series connection with a resistor 93, which is in turn connected to a line 94 connected to the input 61 of the op-amp 62. Also connected to the line 94 and the resistor 93 is a resistor 95 which is serially connected with a normally open start switch 96. The opposite side of the start switch 96 is connected to the negative line 42.

It is thought that the structural features and functional advantages of the clutch actuator circuit have become fully apparent from the foregoing description of parts, but for completeness of disclosure, a brief description of the operation of the clutch actuator will be given.

On initial start-up of the motor 10, the motor starter contacts 17 and 20 are closed to provide power to the motor 10 by the lines 15 and 16. Power for the clutch actuator 13 is taken from the lines 15 and 16 by the lines 33 and 34 to the power supply 30. Flow of current to the motor 10 is through the primary winding 18 of the current-sensing transformer 21, thereby producing an output voltage on the transformer secondary 48 that is proportional to the voltage across the primary winding 18. This voltage appearing at the transformer secondary 48 is applied by the lines 50 and 47 to the rectifier bridge 51, and the rectified output appears across the variable resistor 60, and is applied through the resistor 63 to the input 61 of the op-amp 62. The capacitor 64 tends to smooth the waveform appearing at the input 61 of the op-amp 62.

With power applied to the electrically actuated clutch 12 through the lines 22 and 23, the clutch 12 is in condition to be actuated to connect the motor 10 to the conveyor 11 when the relay switch 86 closes. However, the relay switch 86 will not close until the relay coil 82 has been actuated.

On start-up conditions, with the relay switch 91 in is normally closed position, the positive voltage on the line 45 is applied through resistor 93 to the op-amp input 61. This applied voltage represents a higher voltage than would normally be applied from the bridge 51. A predetermined voltage is applied to the input 71 of the op-amp 61 from the line 45 through the variable resistors 65 and 66.

The voltages at the inputs 61 and 71 are compared by the op-amp 62. When the voltage at the input 61 is higher than the voltage at the input 71, the output of the op-amp 62 remains low, and therefore does not bias the transistor 77 to turn on.

In order to initially actuate the clutch 12, it is necessary that the switch 96 be closed. The closing of the switch 96 initiates current flow through the resistor 95 to the negative line 42, thereby dropping the voltage appearing at the junction of the resistors 93 and 95, which appears at the op-amp input 61. With this drop of voltage at the op-amp input 61, its voltage is less than the voltage appearing at the op-amp input 71, and the output of the op-amp 62 goes high, thereby forward biasing the transistor 77, and allowing the transistor 77 to conduct and current to flow through the relay coil 82, the off switch 85 and to the negative line 42.

Current flow through the relay coil 82 causes the relay switches 86 and 91 to be actuated, thereby opening the switch 91 and closing the switch 86. With the switch 91 now open, there is no longer a connection of the positive voltage output from line 45 through the resistor 93 to the op-amp input 61. Therefore, the voltage appearing at the op-amp input 61 is now controlled solely by the voltage output from the bridge 51 which is proportional to the motor current.

The closing of the relay switch 86 connects the lines 87 and 90 and, through the terminals 5 and 6 of the terminal strip 14, the switch lines 24 and 25 of the clutch 12 thereby actuates the clutch 12 and connects the motor 10 to the conveyor 11.

As long as a normal conveyor load is present, there will be no great increase of the current flow in the motor 10, and the voltage output of the bridge 51 applied to the op-amp input 61 will remain below the voltage applied to the op-amp input 71. However, if conveyor jamming should occur, the motor current would increase. This increased current will result in a higher voltage being present on the transformer secondary 48, resulting in a higher voltage output on the bridge 51, and a higher voltage input to the op-amp 62. If the voltage is sufficiently high, the output 73 of the op-amp 62 will go low, turning off the transistor 77 and stopping the current flow through the coil 82. The relay switches 86 and 91 will then return to their normal positions, interrupting current flow to the clutch 12, and thereby disconnecting the motor 10 from the conveyor 11.

When it is desired to manually disconnect the motor 10 from the conveyor 11 when the system is running, the stop switch 85 is depressed. The stop switch 85 when depressed, disconnects the negative line 42 from the relay coil 82, interrupting the current flow through the coil 82 and allowing the relay contacts 86 and 91 to return to their normal positions, again interrupting current flow to the clutch 12 and thereby causing the motor 10 and conveyor 11 to become disconnected.

It will be understood that under these conditions of disconnecting the motor 10 from the conveyor 11, the motor 10 continues to run. If it is desired then to reconnect the motor 10 to the conveyor 11, the start switch 96 can be manually depressed, initiating the operating sequence that will cause the relay switches 86 and 91 to again be actuated.

The start switch 96 and stop switch 85 can be used for normal starting and stopping of the conveyor 11 without stopping the motor 10. The current to the motor 10, at which point the clutch actuator 13 is actuated for disconnecting the conveyor 11 from the motor 10, can be precisely set by adjusting the variable resistors 66 and 65. It can be adjusted to provide for disconnection of the motor 10 upon a slight increase in load upon the motor 10 or a more substantial increase in load on the motor 10 as might be desirable in a particular application.

I claim as my invention:

1. In an improved motor driven conveyor system including an electrical motor and a conveyor driven by the motor, wherein the improvement comprises:
   (a) an electrically actuated clutch interconnecting the motor and the conveyor in drive relation,
   (b) clutch-actuating means, responsive to motor current for actuating the clutch for selectively disconnecting the motor and conveyor when the motor current is greater than a predetermined value corresponding to motor overload,
   (c) the clutch-actuating means being selectively adjustable for setting said predetermined value,
   (d) the clutch-actuating means including manually actuated means for selectively actuating the clutch for disconnecting the motor from the conveyor and for selectively actuating the clutch for connecting the motor to the conveyor,
   (e) the clutch-actuating means including means for comparing the motor current with a reference signal, and
   (f) the clutch-actuating means including means for generating the reference signal from the line voltage supplied to the motor.

2. A conveyor system as set forth in claim 1 wherein:
   (i) the clutch-actuating means further includes voltage divider means connected to the reference signal generating means for supplying an inhibiting signal to the comparing means,
   (j) said comparing means being responsive to the inhibiting signal and the reference signal to actuate the clutch for disconnecting the motor from the conveyor during starting of the motor and after motor overload.

3. A conveyor system as set forth in claim 2 wherein:
   (k) the manually actuated means for selectively actuating the clutch for connecting the motor to the conveyor is connected to the voltage divider means and when actuated removes the inhibiting signal from the comparing means,
   (l) the comparing means being responsive to removal of the inhibiting signal to actuate the clutch for connecting the motor to the conveyor upon actuation of said manually actuated means.

4. In an improved motor driven conveyor system including an electrical motor and a conveyor driven by the motor, wherein the improvement comprises:
   (a) an electrically actuated clutch interconnecting the motor and the conveyor in drive relation,
   (b) clutch-actuating means, responsive to motor current for actuating the clutch for selectively disconnecting the motor and conveyor when the motor current is greater than a predetermined value corresponding to motor overload,
   (c) the clutch-actuating means being selectively adjustable for setting said predetermined value,
   (d) the clutch-actuating means including manually actuated means for selectively actuating the clutch for disconnecting the motor from the conveyor and for selectively actuating the clutch for connecting the motor to the conveyor,
   (e) the clutch-actuating means including means for comparing a reference signal with a system state signal representative of the fact that the motor has been started,
   (f) said comparing means being responsive to the system state signal and the reference signal to actuate the clutch for disconnecting the motor from the conveyor during starting of the motor.

5. A conveyor system as set forth in claim 4 wherein:
   (o) the manually actuated means for selectively actuating the clutch for connecting the motor to the conveyor is connected to means responsive to actuation of the manually actuated means for removing the system state signal from the comparing means,
   (p) the comparing means being responsive to the removal of the system state signal to actuate the clutch for connecting the motor to the conveyor upon actuation of said manually actuated means.

6. In an improved motor driven conveyor system including an electrical motor and a conveyor driven by the motor, wherein the improvement comprises:
   (a) an electrically actuated clutch interconnecting the motor and the conveyor in drive relation, and
   (b) clutch-actuating means, responsive to motor current for actuating the clutch for selectively disconnecting the motor and conveyor when the motor current is greater than a predetermined value corresponding to motor overload,
   (c) the clutch-actuating means including manually actuated means for selectively actuating the clutch for connecting the motor to the conveyor,
   (d) the clutch-actuating means further including means for comparing the motor current with a reference signal, and
   (e) the clutch-actuating means including means for generating the reference signal from the line voltage supplied to the motor.

7. In an improved motor driven conveyor system including an electrical motor and a conveyor driven by the motor, wherein the improvement comprises:
   (a) an electrically actuated clutch interconnecting the motor and the conveyor in drive relation, and
   (b) clutch-actuating means, responsive to motor current for actuating the clutch for selectively disconnecting the motor and conveyor when the motor current is greater than a predetermined value corresponding to motor overload,
   (c) the clutch-actuating means including manually actuated means for selectively actuating the clutch for connecting the motor to the conveyor,
   (d) the clutch-actuating means further including means for comparing the motor current with a reference signal, (e) the clutch-actuating means further including means for supplying a system state signal to the comparing means, (f) said comparing means being responsive to the system state signal and the reference signal to actuate the clutch for disconnecting the motor from the conveyor during starting of the motor and after motor overload.

8. A conveyor system as set forth in claim 7 wherein:

(j) the manually actuated means is connected to the system state signal means and when actuated removes the system state signal from the comparing means, (k) the comparing means being responsive to the removal of the system state signal to actuate the clutch for connecting the motor to the conveyor upon actuation of the manually actuated means.

9. In an improved motor driven conveyor system including a electrical motor and a conveyor driven by the motor, wherein the improvement comprises:

(a) an electrically actuated clutch interconnecting the motor and the conveyor in drive relation, and (b) clutch-actuating means, responsive to motor current for actuating the clutch for selectively disconnecting the motor and conveyor when the motor current is greater than a predetermined value corresponding to motor overload, (c) the clutch-actuating means including manually actuated means for selectively actuating the clutch for connecting the motor to the conveyor, (d) the clutch-actuating means further including means for comparing a reference signal with a system state signal representative of the fact that the motor has been started or a motor overload has occurred, (e) the comparing means being responsive to the system state signal and the reference signal to actuate the clutch for disconnecting the motor from the conveyor during starting of the motor and after motor overload.

10. A conveyor system as set forth in claim 9 wherein:

(f) the manually actuated means is connected to means responsive to actuation of the manually actuated means for removing the system state signal from the comparing means, (g) the comparing means being responsive to the removal of the system state signal to actuate the clutch for connecting the motor to the conveyor upon actuation of the manually actuated means.

* * * * *

UNITED STATES PATENT AND TRADEMARK OFFICE
CERTIFICATE OF CORRECTION

PATENT NO. : 4,520,909

DATED : June 4, 1985

INVENTOR(S) : Carl T. Brewer

It is certified that error appears in the above-identified patent and that said Letters Patent are hereby corrected as shown below:

```
Column 1, Line 14, delete "deviced" and insert --devised--.
Column 3, Line 35, delete "90" and insert --91--.
Column 4, Line  5, delete "is" and insert --its--.
Column 4, Line  8, delete "is".
Column 5, Line 47, delete "(i)" and insert --(g)--.
Column 5, Line 51, delete "(j)" and insert --(h)--.
Column 5, Line 57, delete "(k)" and insert --(i)--.
Column 5, Line 62, delete "(l)" and insert --(j)--.
Column 6, Line 24, delete "(o)" and insert --(g)--.
Column 6, Line 29, delete "(p)" and insert --(h)--.
Column 7, Line 10, delete "(j)" and insert --(g)--.
Column 7, Line 14, delete "(k)" and insert --(h)--.
```

Signed and Sealed this

First Day of October 1985

[SEAL]

Attest:

*Attesting Officer*

DONALD J. QUIGG

*Commissioner of Patents and Trademarks—Designate*